United States Patent
Nunoo et al.

(10) Patent No.: US 12,463,230 B2
(45) Date of Patent: Nov. 4, 2025

(54) PROTON CONDUCTOR, ELECTROLYTE MEMBRANE, MEMBRANE ELECTRODE ASSEMBLY, ELECTROCHEMICAL CELL AND FUEL CELL STACK

(71) Applicant: Panasonic Intellectual Property Management Co., Ltd., Osaka (JP)

(72) Inventors: Kosuke Nunoo, Osaka (JP); Yuichi Mikami, Kyoto (JP); Hiroshi Asano, Osaka (JP); Tomohiro Kuroha, Osaka (JP); Yuji Okuyama, Miyazaki (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 566 days.

(21) Appl. No.: 17/901,872

(22) Filed: Sep. 2, 2022

(65) Prior Publication Data

US 2023/0006234 A1    Jan. 5, 2023

Related U.S. Application Data

(63) Continuation of application No. PCT/JP2021/001791, filed on Jan. 20, 2021.

(30) Foreign Application Priority Data

Mar. 25, 2020    (JP) .................. 2020-055149

(51) Int. Cl.
| | | |
|---|---|---|
| *H01M 8/1213* | (2016.01) | |
| *C01G 25/00* | (2006.01) | |
| *H01M 8/1246* | (2016.01) | |

(52) U.S. Cl.
CPC ........ *H01M 8/1213* (2013.01); *C01G 25/006* (2013.01); *H01M 8/1246* (2013.01); *C01P 2002/50* (2013.01); *C01P 2006/40* (2013.01)

(58) Field of Classification Search
CPC ............... C01G 25/006; C01P 2002/50; C01P 2006/40; H01M 2300/0068; H01M 2300/0074; H01M 8/1213; H01M 8/1246; Y02E 60/50
See application file for complete search history.

(56) References Cited

FOREIGN PATENT DOCUMENTS

JP    2009-023883    2/2009

OTHER PUBLICATIONS

International Search Report of PCT application No. PCT/JP2021/001791 dated Apr. 6, 2021.
The EPC Office Action dated Nov. 30, 2023 for the related European Patent Application No. 21775860.6.
Satapathy Avishek et al: "Investigation of proton conductivity in Sc and Yb co-doped barium zirconate ceramics", Materials Research Express, vol. 6, No. 5, Feb. 27, 2019 (Feb. 27, 2019), p. 056305, XP093102023, Retrieved from the Internet: URL:http://iopscience.iop.org/article/10.1088/2053-1591/ab0680>.

*Primary Examiner* — Victoria H Lynch
(74) *Attorney, Agent, or Firm* — Rimon P.C.

(57) ABSTRACT

A proton conductor of the present disclosure includes a compound represented by the chemical formula $BaZr_{(1-x-y)}Yb_xSc_yO_{3-\delta}$. The chemical formula satisfies $0<x<0.5$, $0<y<0.5$, $(x+y)<0.5$, and $0<\delta<0.5$.

11 Claims, 3 Drawing Sheets

PROTON CONDUCTOR, ELECTROLYTE MEMBRANE, MEMBRANE ELECTRODE ASSEMBLY, ELECTROCHEMICAL CELL AND FUEL CELL STACK

BACKGROUND

1. Technical Field

The present disclosure relates to a proton conductor, an electrolyte membrane, a membrane electrode assembly, an electrochemical cell and a fuel cell stack.

2. Description of the Related Art

Perovskite-type composite oxides represented by the chemical formula $BaZr_{1-x}M_xO_{3-\alpha}$ are known as proton conductive electrolyte materials. In the chemical formula, M is a trivalent substitution element.

Japanese Unexamined Patent Application Publication No. 2009-23883 (Patent Literature 1) discloses a proton conductor represented by the chemical formula $BaZr_{0.85}Y_{0.15}O_3$ or $BaZr_{0.85}Y_{0.10}Sc_{0.05}O_3$. According to Patent Literature 1, the addition of Sc to a proton conductor represented by the chemical formula $BaZr_{1-x}M_xO_{3-\alpha}$ promotes the crystal growth during sintering and results in a proton conductor having a large crystal grain size. As a result, the crystal grain boundaries, which have a higher resistance than the inside of the crystal grains, come to represent a smaller proportion relative to the whole, and thus the resistance of the whole of the proton conductor is lowered.

SUMMARY

As described above, Patent Literature 1 discloses a proton conductor that attains a low resistance of the whole by increasing of the crystal grain size. However, further reduction of the proton conductor resistance requires that the proton conductivity of the material itself of the proton conductor be enhanced.

One non-limiting and exemplary embodiment provides a proton conductor having high proton conductivity.

In one general aspect, the techniques disclosed here feature a proton conductor including a compound represented by the chemical formula $BaZr_{(1-x-y)}Yb_xSc_yO_{3-\delta}$ wherein the chemical formula satisfies $0<x<0.5$, $0<y<0.5$, $(x+y)<0.5$, and $0<\delta<0.5$.

The proton conductor provided according to the present disclosure has high proton conductivity.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTIONS

Embodiment 1

A proton conductor according to embodiment 1 includes a compound represented by the chemical formula $BaZr_{(1-x-y)}Yb_xSc_yO_{3-\delta}$. Here, the chemical formula satisfies $0<x<0.5$, $0<y<0.5$, $(x+y)<0.5$, and $0<\delta<0.5$.

By virtue of the satisfaction of the mathematical formula: $(x+y)<0.5$, the proton conductor according to the embodiment 1 forms a dense body when heat-treated, as will be demonstrated in EXAMPLES 1 to 10 described later. If the value of $(x+y)$ is greater than or equal to 0.5, cracks occur during pellet preparation as will be demonstrated in COMPARATIVE EXAMPLE 1 described later. Provided that the dopant compositional ratios are the same as one another, proton conductors having a combination of dopants other than Yb and Sc are low in proton conductivity as compared to the proton conductors having a combination of Yb and Sc dopants, as will be demonstrated in COMPARATIVE EXAMPLES 2 to 8. Here, the phrase "the dopant compositional ratios are the same" as one another means that the molar ratios of the dopants in the proton conductors are the same.

As described above, the proton conductor according to the embodiment 1 that includes the above-described compound has higher proton conductivity than a proton conductor that has a combination of dopants other than Yb and Sc in the same dopant compositional ratio as the proton conductor according to the embodiment 1.

The chemical formula $BaZr_{(1-x-y)}Yb_xSc_yO_{3-\delta}$ desirably satisfies the mathematical formula: $y \leq x$.

As will be demonstrated by the comparison of EXAMPLES 1 and 2 described later, the comparison of EXAMPLES 4 and 6 described later, and the comparison of EXAMPLES 5 and 8 described later, the proton conductor according to the embodiment 1 attains higher proton conductivity when the mathematical formula: $y \leq x$ is satisfied.

Further, the chemical formula $BaZr_{(1-x-y)}Yb_xSc_yO_{3-\delta}$ desirably satisfies the mathematical formula: $(x+y) \geq 0.15$.

As will be demonstrated in EXAMPLES 1 to 10 described later, the proton conductor according to the embodiment 1 attains high proton conductivity when the mathematical formula: $(x+y) \geq 0.15$ is satisfied.

Furthermore, the chemical formula $BaZr_{(1-x-y)}Yb_xSc_yO_{3-\delta}$ desirably satisfies the mathematical formula: $(x+y) \geq 0.25$.

As will be demonstrated in EXAMPLES 4 to 10 described later, the proton conductor according to the embodiment 1 attains higher proton conductivity when the mathematical formula: $(x+y) \geq 0.25$ is satisfied.

Further, the chemical formula $BaZr_{(1-x-y)}Yb_xSc_yO_{3-\delta}$ desirably satisfies the mathematical formula $(x+y) \leq 0.35$.

As will be demonstrated in EXAMPLES 1 to 8 described later, the proton conductor according to the embodiment 1 attains high proton conductivity when the mathematical formula: $(x+y) \leq 0.35$ is satisfied.

Further, the chemical formula $BaZr_{(1-x-y)}Yb_xSc_yO_{3-\delta}$ desirably satisfies the mathematical formula $x \geq 0.15$.

As will be demonstrated in EXAMPLES 6 to 10 described later, the proton conductor according to the embodiment 1 attains high proton conductivity when the mathematical formula: $x \geq 0.15$ is satisfied.

More desirably, the chemical formula $BaZr_{(1-x-y)}Yb_xSc_yO_{3-\delta}$ satisfies $x=0.2$ and $y=0.1$.

As will be demonstrated in EXAMPLE 8 described later, the proton conductor according to the embodiment 1 attains the highest proton conductivity when x=0.2 and y=0.1 are satisfied.

The proton conductor according to the embodiment 1 may be synthesized by a citric acid complex method, a solid-phase sintering method, a coprecipitation method, a nitrate method or a spray granulation method.

The proton conductor according to the embodiment 1 may include the compound represented by the chemical formula $BaZr_{(1-x-y)}Yb_xSc_yO_{3-\delta}$ in any proportion. For example, the proton conductor according to the embodiment 1 may include the compound represented by the chemical formula $BaZr_{(1-x-y)}Yb_xSc_y O_{3-\delta}$ in a molar ratio of greater than or equal to 5% or in a molar ratio of greater than or equal to 20%. When the proton conductor according to the embodiment 1 includes the compound represented by the chemical formula $BaZr_{(1-x-y)}Yb_xSc_yO_{3-\delta}$ in the above range, the proton conductor according to the embodiment 1 can exhibit high proton conductivity.

The proton conductor according to the embodiment 1 may be composed of the compound represented by the chemical formula $BaZr_{(1-x-y)}Yb_xSc_yO_{3-\delta}$. The phrase "the proton conductor according to the embodiment 1 is composed of the compound represented by the chemical formula $BaZr_{(1-x-y)}Yb_xSc_yO_{3-\delta}$" means that the compound represented by the chemical formula $BaZr_{(1-x-y)}Yb_xSc_yO_{3-\delta}$ represents a molar ratio of greater than or equal to 80% of the proton conductor according to the embodiment 1. When the proton conductor according to the embodiment 1 is composed of the compound represented by the chemical formula $BaZr_{(1-x-y)}Yb_xSc_yO_{3-\delta}$, the proton conductor according to the embodiment 1 can exhibit higher proton conductivity.

As an example, the proton conductor according to the embodiment 1 may consist essentially of the compound represented by the chemical formula $BaZr_{(1-x-y)}Yb_xSc_yO_{3-\delta}$. The phrase "the proton conductor according to the embodiment 1 consists essentially of the compound represented by the chemical formula $BaZr_{(1-x-y)}Yb_xSc_yO_{3-\delta}$" means that the proton conductor according to the embodiment 1 consists solely of the compound represented by the chemical formula $BaZr_{(1-x-y)}Yb_xSc_yO_{3-\delta}$ except for inevitable impurity components. In this case, the compound represented by the chemical formula $BaZr_{(1-x-y)}Yb_xSc_yO_{3-\delta}$ may represent a molar ratio of greater than or equal to 95% of the proton conductor according to the embodiment 1.

The proton conductor according to the embodiment 1 may include an additional component in addition to the compound represented by the chemical formula $BaZr_{(1-x-y)}Yb_xSc_yO_{3-\delta}$. For example, the proton conductor according to the embodiment 1 may further include such additional components as impurities occurring in the process of synthesizing the above compound.

The compound of the chemical formula $BaZr_{(1-x-y)}Yb_xSc_yO_{3-\delta}$ that is present in the proton conductor according to the embodiment 1 has an average crystal grain size of, for example, greater than or equal to 0.1 μm and less than or equal to 10 μm. The proton conductor according to the embodiment 1 may attain high proton conductivity when the average crystal grain size is in the above range or even when the average crystal grain size is smaller than 0.1 μm. Here, the average crystal grain size may be obtained by, for example, measuring the grain size distribution and determining the (volume-based) median diameter.

Embodiment 2

Figure 1:
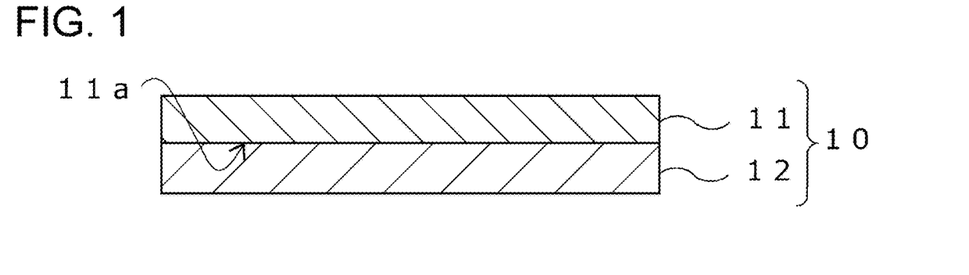
FIG. 1 illustrates a sectional view of a membrane electrode assembly according to embodiment 2.

FIG. 1 illustrates a sectional view of a membrane electrode assembly 10 according to embodiment 2. The membrane electrode assembly 10 includes an electrolyte membrane 11 and a first electrode 12. The first electrode 12 is provided on a first main surface 11a of the electrolyte membrane 11.

As an electrolyte material, the electrolyte membrane 11 includes the proton conductor described in the embodiment 1. The electrolyte membrane 11 may further include an additional proton conductive compound other than the compound represented by the chemical formula $BaZr_{(1-x-y)}Yb_xSc_yO_{3-\delta}$. Examples of such additional compounds include compounds represented by the chemical formula $BaZr_{1-x1}M1_{x1}O_{3-\delta}$, compounds represented by the chemical formula $BaCe_{1-x2}M2_{x2}O_{3-\delta}$, and compounds represented by the chemical formula $BaZr_{1-x3-y3}Ce_{x3}M3_{y3}O_{3-\delta}$. Here, M1, M2 and M3 each include at least one selected from the group consisting of Pr, Nd, Sm, Eu, Gd, Tb, Dy, Ho, Er, Tm, Yb, Y, Sc, In and Lu, and $0<x1<1$, $0<x2<1$, $0<x3<1$, $0<y3<1$, and $0<\delta<0.5$ are satisfied. The electrolyte membrane 11 may further include an electrolyte material other than proton conductors.

For example, the thickness of the electrolyte membrane 11 is 1 to 50 μm.

For example, the first electrode 12 may principally include at least one compound of the following:
(i) mixtures (cermets) of the electrolyte material contained in the electrolyte membrane 11, and Ni and one or more metals selected from the group consisting of Co, Fe, Pt and Pt;
(ii) lanthanum-containing composite oxides;
(iii) barium-containing composite oxides; and
(iv) strontium-containing composite oxides.

The phrase that the first electrode 12 principally includes a certain compound means that the compound represents the largest mass ratio in the first electrode 12.

For example, the first electrode 12 has a thickness of 1 to 1000 μm. When the first electrode 12 also serves as a cell support, the thickness of the first electrode 12 is desirably 100 μm to 700 μm. When the cell support is a member other than the first electrode 12, the thickness of the first electrode 12 is desirably 10 μm to 50 μm.

Figure 2:
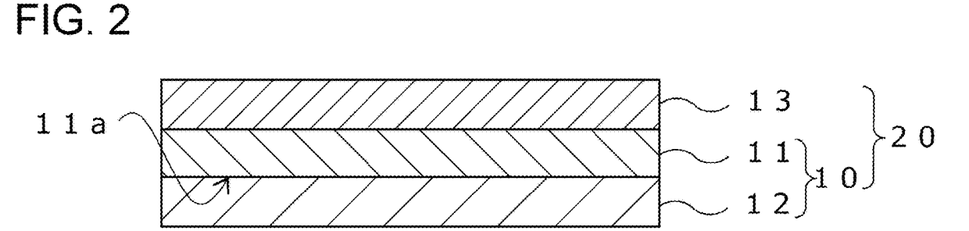
FIG. 2 illustrates a sectional view of an electrochemical cell according to embodiment 3.

While FIG. 2 illustrates the electrolyte membrane 11 and the first electrode 12 as being in contact with each other, an additional layer may be provided between the electrolyte membrane 11 and the first electrode 12. For example, such an additional layer may be a functional layer. The functional layer is a layer that promotes the transfer of electrons or protons between the electrolyte membrane 11 and the first electrode 12. For example, the functional layer is composed of a composite of a cermet and a composite oxide.

For example, the electrolyte membrane 11 is produced by a tape casting method, a spin coating method, a dip coating method, sputtering or PLD (pulse laser deposition).

Embodiment 3

FIG. 2 illustrates a cross section of an electrochemical cell 20 according to embodiment 3.

The electrochemical cell 20 according to the embodiment 3 includes a membrane electrode assembly 10 and a second electrode 13. That is, the electrochemical cell 20 includes a first electrode 12, an electrolyte membrane 11 and a second electrode 13.

The membrane electrode assembly 10 is described in the embodiment 2.

In the electrochemical cell 20, as illustrated in FIG. 2, the first electrode 12, the electrolyte membrane 11 and the second electrode 13 are arranged in the order. That is, the electrolyte membrane 11 is sandwiched between the first electrode 12 and the second electrode 13. In other words, the electrolyte membrane 11 is provided between the first electrode 12 and the second electrode 13.

For example, the electrochemical cell 20 according to the embodiment 3 may be used as a fuel cell. That is, for example, the first electrode 12 may function as a fuel electrode, and the second electrode 13 may function as an air electrode.

When the second electrode 13 functions as an air electrode, the second electrode 13 includes a composite compound. For example, the second electrode 13 principally includes a lanthanum strontium cobalt oxide. For example, the second electrode 13 may be formed on the membrane electrode assembly 10 by a screen printing method.

While FIG. 2 illustrates the second electrode 13 and the electrolyte membrane 11 as being in contact with each other, the arrangement is not limited thereto and an additional layer may be provided between the second electrode 13 and the electrolyte membrane 11.

For example, such an additional layer may be a functional layer. The functional layer is described in the embodiment 2.

The electrochemical cell 20 may be used in a fuel cell, an electrochemical hydrogen pump, a hydrogen sensor, and a water electrolyzer.

Embodiment 4

Figure 3:
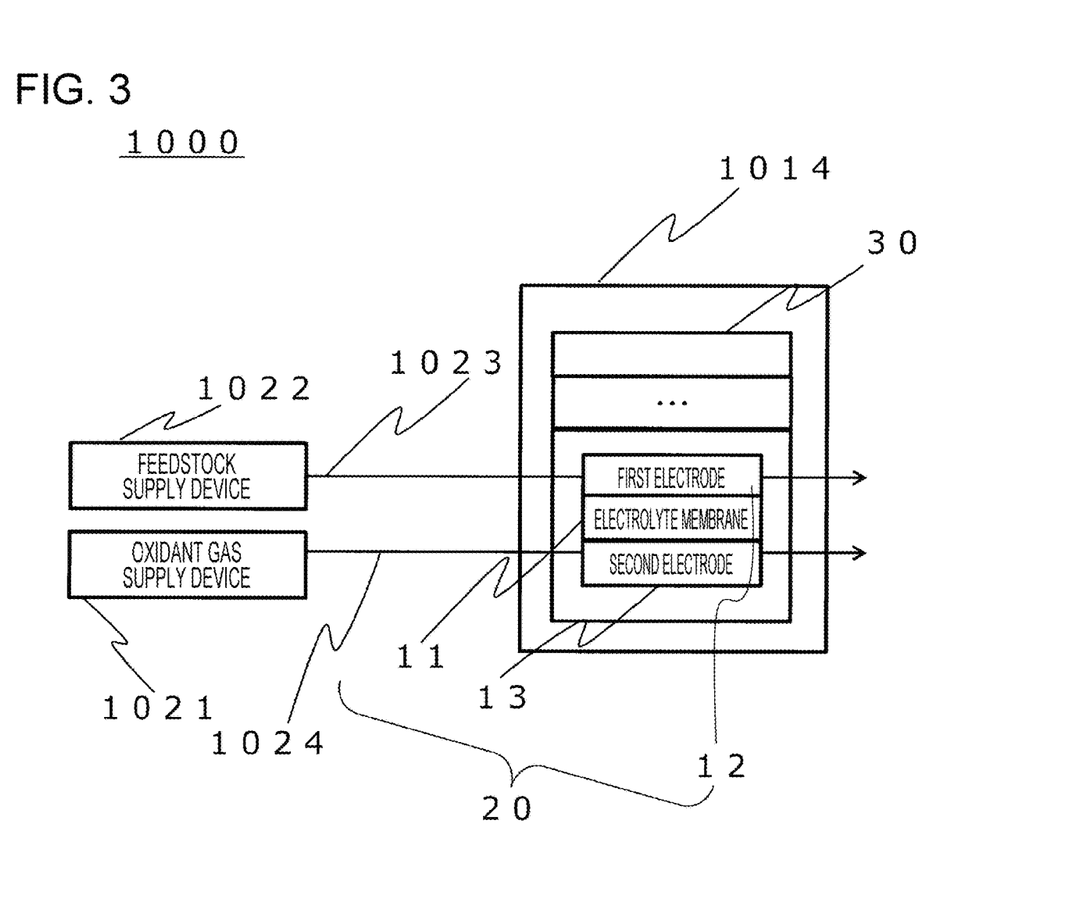
FIG. 3 illustrates a fuel cell system according to embodiment 4.

FIG. 3 schematically illustrates a fuel cell system 1000 according to embodiment 4.

The fuel cell system 1000 includes an electrochemical cell 20. The electrochemical cell 20 is described in the embodiment 3.

In the fuel cell system 1000 according to the embodiment 4, the electrochemical cell 20 is used as a fuel cell. Thus, in this case, the first electrode 12 functions as a fuel electrode, and the second electrode 13 functions as an air electrode.

The fuel cell system 1000 further includes an oxidant gas supply line 1024 and a feedstock gas supply line 1023. The oxidant gas supply line 1024 is connected to the second electrode 13 and an oxidant gas supply device 1021. The feedstock gas supply line 1023 is connected to the first electrode 12 and a feedstock supply device 1022.

The electrochemical cells 20 are stacked to form a fuel cell stack 30. That is, the fuel cell stack 30 includes a plurality of electrochemical cells 20. The fuel cell stack 30 attains a high output. The fuel cell stack 30 is stored in a housing 1014.

The housing 1014 may be composed of a thermally insulating member. An oxidant gas is supplied to the second electrodes 13 in the stacked electrochemical cells 20.

Specifically, an oxidant gas is supplied from the oxidant gas supply device 1021 through the oxidant gas supply line 1024 to the second electrodes 13 (that is, the cathodes) in the electrochemical cells 20.

At the second electrode 13, the following reaction (1) proceeds:

$$O_2 + 4H^+ + 4e^- \rightarrow 2H_2O \quad (1)$$

For example, the oxidant gas is air.

A feedstock is supplied from the feedstock supply device 1022 through the feedstock gas supply line 1023 to the first electrodes 12 in the electrochemical cells 20.

At the first electrode 12, the following reaction (2) proceeds:

$$2H_2 \rightarrow 4H^+ + 4e^- \quad (2)$$

For example, the feedstock is hydrogen molecules.

Hydrogen may be produced by a reforming reaction. Alternatively, hydrogen may be produced by water electrolysis.

The fuel cell system 1000 is operated as described above, and the fuel cell system 1000 generates electricity.

EXAMPLES

Hereinbelow, the present disclosure will be described in greater detail with reference to the following EXAMPLES and COMPARATIVE EXAMPLES.

<Proton Conductors≤

In EXAMPLES and COMPARATIVE EXAMPLES, proton conductors and evaluation pellets including the proton conductors were prepared as described below. Characteristics of the proton conductors were evaluated using the evaluation pellets.

Example 1

(Preparation of Proton Conductor)

Figure 4:
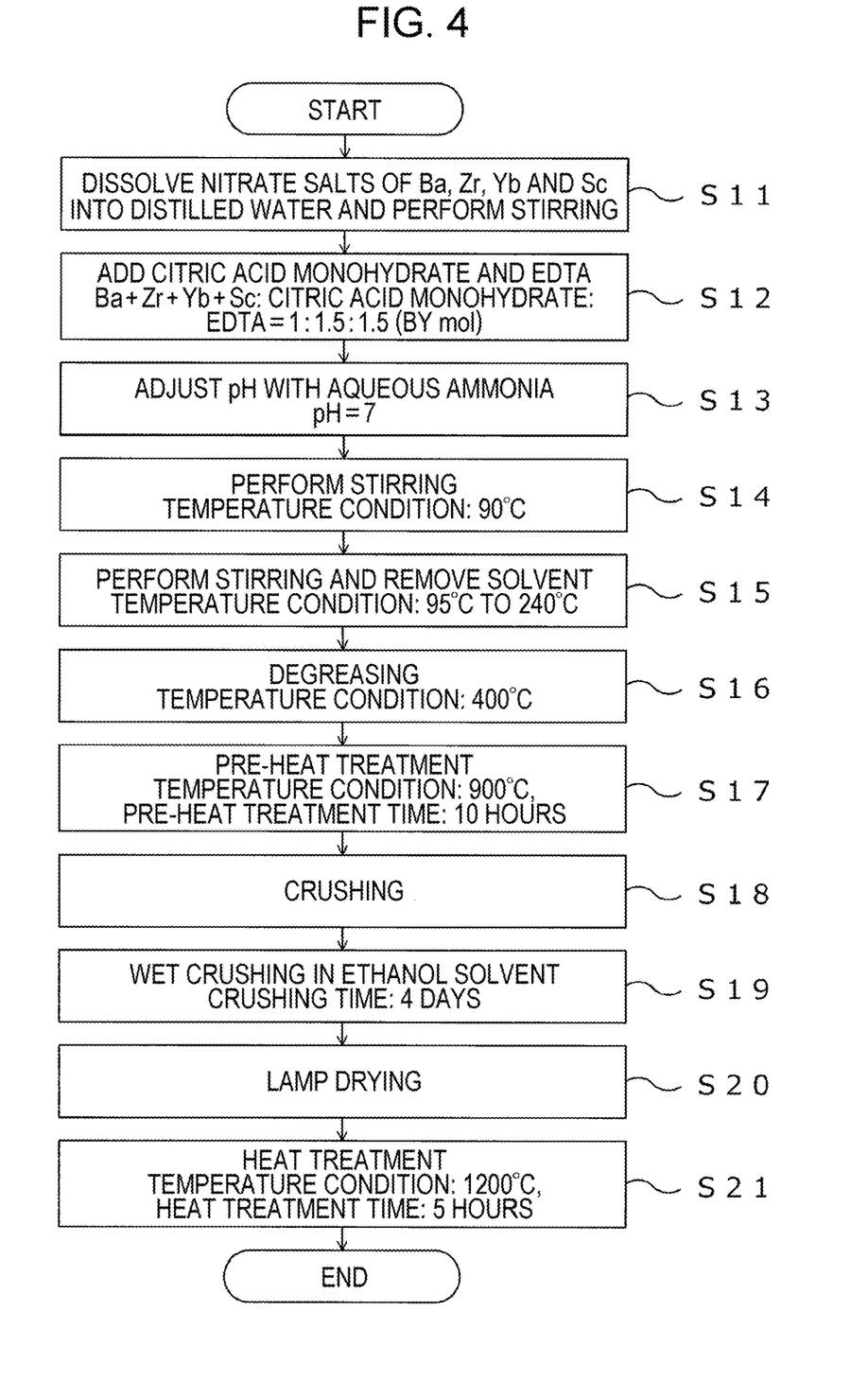
FIG. 4 is a flowchart illustrating an exemplary method for producing a proton conductor according to EXAMPLE.

FIG. 4 is a flowchart illustrating an exemplary method for producing a proton conductor according to EXAMPLE. The preparation of a proton conductor will be described with reference to FIG. 4.

The following materials were provided as starting materials for the proton conductor.

Ba(NO$_3$)$_2$ (manufactured by KANTO CHEMICAL CO., INC.) 0.100 mol

ZrO(NO$_3$)$_2$·2H$_2$O (manufactured by KANTO CHEMICAL CO., INC.) 0.085 mol

Yb(NO$_3$)$_3$·xH$_2$O (2<x<6, manufactured by Kojundo Chemical Laboratory Co., Ltd.) 0.005 mol Sc(NO$_3$)$_3$·xH$_2$O (2<x<6, manufactured by Kojundo Chemical Laboratory Co., Ltd.) 0.010 mol The above starting materials were added to 1000 mL of distilled water and were dissolved to give a mixture liquid, and the mixture liquid was stirred (S11).

Next, 0.3 mol of citric acid monohydrate (manufactured by KANTO CHEMICAL CO., INC.) and 0.3 mol of ethylenediaminetetraacetic acid (manufactured by KANTO CHEMICAL CO., INC.) were added to the mixture liquid (S12). Hereinafter, "ethylenediaminetetraacetic acid" is written as "EDTA".

Next, while using a pH meter (manufactured by HORIBA, Ltd.), the pH of the mixture liquid was adjusted to 7 by adding aqueous ammonia (28 mass %, manufactured by KANTO CHEMICAL CO., INC.) to the mixture liquid (S13).

Next, the mixture liquid was stirred at a temperature of 90° C. (S14).

After the pH of the mixture liquid had been adjusted to 7, the temperature of the mixture liquid was increased from 95° C. to 240° C. using a hot stirrer (S15) to evaporate the solvent (namely, water) from the mixture liquid. In this manner, water was removed from the mixture liquid, and a solid was obtained.

The solid obtained was crushed in a mortar and was degreased at a temperature of about 400° C. (S16). A powder was thus obtained.

With use of a hydraulic pump (manufactured by Enerpac Co., Ltd.) and a powder compaction die having a diameter of 30 mm, the powder obtained was pressed into a cylindrical shape. A cylindrical compact was thus obtained.

Subsequently, the cylindrical compact obtained was pre-heat-treated in an air atmosphere at 900° C. for 10 hours (S17). A pre-heat-treated compact was thus obtained.

The pre-heat-treated compact was then crushed (S18). Next, the crushed powder was transferred to a plastic container together with zirconia balls.

Subsequently, 100 g of ethanol (manufactured by KANTO CHEMICAL CO., INC.) was added to the plastic container. A mixture liquid was thus obtained. Next, the mixture liquid was crushed with a ball mill for 96 hours (S19).

After the ball mill crushing, the mixture liquid was dried using a lamp, and the ethanol was removed from the mixture liquid (S20). A powder was thus obtained.

The powder obtained was heat-treated in an air atmosphere at 1200° C. for 5 hours (S21).

By the procedure described above, a proton conductor of EXAMPLE 1 was produced.

(Preparation of Evaluation Pellet)

First, the powder of the proton conductor prepared by the above method was vacuum dried at 200° C. for 12 hours.

Next, the powder obtained was pressed into a cylindrical shape with use of a hydraulic pump (manufactured by Enerpac Co., Ltd.) and a powder compaction die having a diameter of 30 mm, and was further formed into a pellet with a cold hydrostatic press (manufactured by Sansho Industry Co., Ltd.) at a press pressure of 200 MPa.

The cylindrical pellet obtained was heat-treated in an oxygen atmosphere at 1600° C. for 10 hours. A sintered pellet was thus obtained.

The sintered pellet obtained was cut with a low-speed cutter (IsoMet 4000) into a disk having a thickness of about 500 μm. An evaluation pellet was thus obtained. Both sides of the evaluation pellet were polished using a lapping film sheet having 3 μm abrasive grains.

Subsequently, a Ag paste (manufactured by TANAKA Kikinzoku Kogyo K. K.) was applied to the polished surfaces on both sides of the evaluation pellet by a screen printing method. The Ag paste applied had a diameter of 10 mm.

Subsequently, the evaluation pellet coated with the Ag paste was heat-treated in an air atmosphere at 900° C. for 1 hour. An evaluation pellet of EXAMPLE 1 was thus prepared.

(Evaluation of Proton Conductivity)

Using the evaluation pellet of EXAMPLE 1, the proton conductivity of the proton conductor was calculated from the resistance of the pellet and the thickness of the pellet. The resistance of the pellet was measured based on an AC impedance method. The proton conductivity was determined as follows.

Using Solartron 1287 (manufactured by Solartron Analytical), AC signals with an amplitude of 10 mV were applied to the pellet in the range of frequencies of 1 MHz to 0.01 Hz. The measurement was performed in a humidified hydrogen atmosphere at 400° C. or 600° C. A Cole-Cole plot was output. With respect to the arc in the Cole-Cole plot that had been output, the intersections of the arc and the real axis were determined. The real axis is the axis on which values on the Y axis in the Cole-Cole plot graph are 0. Of the intersections obtained, the intersection on the high frequency side was taken as the resistance of the pellet.

The proton conductivity of the proton conductor was calculated based on the resistance obtained and the thickness of the pellet.

Example 2

In EXAMPLE 2, a proton conductor and an evaluation pellet were prepared, and the proton conductivity was evaluated in the same manner as in EXAMPLE 1 except for the following item (1).

(1) The starting materials for the proton conductor were changed to the following materials.

$Ba(NO_3)_2$ (manufactured by KANTO CHEMICAL CO., INC.) 0.100 mol $ZrO(NO_3)_2 \cdot 2H_2O$ (manufactured by KANTO CHEMICAL CO., INC.) 0.085 mol $Yb(NO_3)_3 \cdot xH_2O$ (2<x<6, manufactured by Kojundo Chemical Laboratory Co., Ltd.) 0.010 mol $Sc(NO_3)_3 \cdot xH_2O$ (2<x<6, manufactured by Kojundo Chemical Laboratory Co., Ltd.) 0.005 mol Example 3

In EXAMPLE 3, a proton conductor and an evaluation pellet were prepared, and the proton conductivity was evaluated in the same manner as in EXAMPLE 1 except for the following item (1).

(1) The starting materials for the proton conductor were changed to the following materials.

$Ba(NO_3)_2$ (manufactured by KANTO CHEMICAL CO., INC.) 0.100 mol $ZrO(NO_3)_2 \cdot 2H_2O$ (manufactured by KANTO CHEMICAL CO., INC.) 0.080 mol $Yb(NO_3)_3 \cdot xH_2O$ (2<x<6, manufactured by Kojundo Chemical Laboratory Co., Ltd.) 0.010 mol $Sc(NO_3)_3 \cdot xH_2O$ (2<x<6, manufactured by Kojundo Chemical Laboratory Co., Ltd.) 0.010 mol Example 4

In EXAMPLE 4, a proton conductor and an evaluation pellet were prepared, and the proton conductivity was evaluated in the same manner as in EXAMPLE 1 except for the following item (1).

(1) The starting materials for the proton conductor were changed to the following materials.

$Ba(NO_3)_2$ (manufactured by KANTO CHEMICAL CO., INC.) 0.100 mol $ZrO(NO_3)_2 \cdot 2H_2O$ (manufactured by KANTO CHEMICAL CO., INC.) 0.075 mol $Yb(NO_3)_3 \cdot xH_2O$ (2<x<6, manufactured by Kojundo Chemical Laboratory Co., Ltd.) 0.010 mol $Sc(NO_3)_3 \cdot xH_2O$ (2<x<6, manufactured by Kojundo Chemical Laboratory Co., Ltd.) 0.015 mol Example 5

In EXAMPLE 5, a proton conductor and an evaluation pellet were prepared, and the proton conductivity was evaluated in the same manner as in EXAMPLE 1 except for the following item (1).

(1) The starting materials for the proton conductor were changed to the following materials.

$Ba(NO_3)_2$ (manufactured by KANTO CHEMICAL CO., INC.) 0.100 mol $ZrO(NO_3)_2 \cdot 2H_2O$ (manufactured by KANTO CHEMICAL CO., INC.) 0.075 mol $Yb(NO_3)_3 \cdot xH_2O$ (2<x<6, manufactured by Kojundo Chemical Laboratory Co., Ltd.) 0.010 mol Sc(NO$_3$)$_3$·xH$_2$O (2<x<6, manufactured by Kojundo Chemical Laboratory Co., Ltd.) 0.020 mol Example 6

In EXAMPLE 6, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.015 mol
Sc(NO$_3$)$_3$·xH$_2$O (2<x<6, manufactured by Kojundo Chemical Laboratory Co., Ltd.) 0.010 mol Example 7

In EXAMPLE 7, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.020 mol
Sc(NO$_3$)$_3$·xH$_2$O (2<x<6, manufactured by Kojundo Chemical Laboratory Co., Ltd.) 0.005 mol Example 8

In EXAMPLE 8, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.020 mol
Sc(NO$_3$)$_3$·xH$_2$O (2<x<6, manufactured by Kojundo Chemical Laboratory Co., Ltd.) 0.010 mol Example 9

In EXAMPLE 9, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.060 mol
Yb(NO$_3$)$_3$·xH$_2$O (2<x<6, manufactured by Kojundo Chemical Laboratory Co., Ltd.) 0.020 mol
Sc(NO$_3$)$_3$·xH$_2$O (2<x<6, manufactured by Kojundo Chemical Laboratory Co., Ltd.) 0.020 mol Example 10

In EXAMPLE 10, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.065 mol
Yb(NO$_3$)$_3$·xH$_2$O (2<x<6, manufactured by Kojundo Chemical Laboratory Co., Ltd.) 0.025 mol
Sc(NO$_3$)$_3$·xH$_2$O (2<x<6, manufactured by Kojundo Chemical Laboratory Co., Ltd.) 0.010 mol Comparative Example 1

In COMPARATIVE EXAMPLE 1, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.050 mol
Yb(NO$_3$)$_3$·xH$_2$O (2<x<6, manufactured by Kojundo Chemical Laboratory Co., Ltd.) 0.030 mol
Sc(NO$_3$)$_3$·xH$_2$O (2<x<6, manufactured by Kojundo Chemical Laboratory Co., Ltd.) 0.020 mol Comparative Example 2

In COMPARATIVE EXAMPLE 2, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Y(NO$_3$)$_3$·xH$_2$O (2<x<6, manufactured by Kojundo Chemical Laboratory Co., Ltd.) 0.020 mol
Sc(NO$_3$)$_3$·xH$_2$O (2<x<6, manufactured by Kojundo Chemical Laboratory Co., Ltd.) 0.010 mol Comparative Example 3

In COMPARATIVE EXAMPLE 3, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol ZrO(NO$_3$)$_2$·2H$_2$O (manufactured by KANTO CHEMICAL CO., INC.) 0.075 mol
Lu(NO$_3$)$_3$·xH$_2$O (2<x<6, manufactured by Kojundo Chemical Laboratory Co., Ltd.) 0.020 mol
Sc(NO$_3$)$_3$·xH$_2$O (2<x<6, manufactured by Kojundo Chemical Laboratory Co., Ltd.) 0.010 mol Comparative Example 4

In COMPARATIVE EXAMPLE 4, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.020 mol
In(NO$_3$)$_3$·xH$_2$O (2<x<6, manufactured by Kojundo Chemical Laboratory Co., Ltd.) 0.010 mol Comparative Example 5

In COMPARATIVE EXAMPLE 5, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.060 mol
Yb(NO$_3$)$_3$·xH$_2$O (2<x<6, manufactured by Kojundo Chemical Laboratory Co., Ltd.) 0.020 mol
In(NO$_3$)$_3$·xH$_2$O (2<x<6, manufactured by Kojundo Chemical Laboratory Co., Ltd.) 0.020 mol Comparative Example 6

In COMPARATIVE EXAMPLE 6, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.020 mol
Lu(NO$_3$)$_3$·xH$_2$O (2<x<6, manufactured by Kojundo Chemical Laboratory Co., Ltd.) 0.010 mol Comparative Example 7

In COMPARATIVE EXAMPLE 7, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.060 mol
Yb(NO$_3$)$_3$·xH$_2$O (2<x<6, manufactured by Kojundo Chemical Laboratory Co., Ltd.) 0.020 mol
Lu(NO$_3$)$_3$·xH$_2$O (2<x<6, manufactured by Kojundo Chemical Laboratory Co., Ltd.) 0.020 mol Comparative Example 8

In COMPARATIVE EXAMPLE 8, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.075 mol
Yb(NO$_3$)$_3$·xH$_2$O (2<x<6, manufactured by Kojundo Chemical Laboratory Co., Ltd.) 0.020 mol
Al(NO$_3$)$_3$·xH$_2$O (2<x<6, manufactured by Kojundo Chemical Laboratory Co., Ltd.) 0.010 mol Comparative Example 9

In COMPARATIVE EXAMPLE 9, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.090 mol
Sc(NO$_3$)$_3$·xH$_2$O (2<x<6, manufactured by Kojundo Chemical Laboratory Co., Ltd.) 0.010 mol Comparative Example 10

In COMPARATIVE EXAMPLE 10, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol
ZrO(NO$_3$)$_2$·2H$_2$O (manufactured by KANTO CHEMICAL CO., INC.) 0.080 mol
Sc(NO$_3$)$_3$·xH$_2$O (2<x<6, manufactured by Kojundo Chemical Laboratory Co., Ltd.) 0.020 mol Comparative Example 11

In COMPARATIVE EXAMPLE 11, a proton conductor and an evaluation pellet were prepared, and the proton conductivity was evaluated in the same manner as in EXAMPLE 1 except for the following item (1).
(1) The starting materials for the proton conductor were changed to the following materials.
Ba(NO$_3$)$_2$ (manufactured by KANTO CHEMICAL CO., INC.) 0.100 mol ZrO(NO$_3$)$_2$·2H$_2$O (manufactured by KANTO CHEMICAL CO., INC.) 0.075 mol Sc(NO$_3$)$_3$·xH$_2$O (2<x<6, manufactured by Kojundo Chemical Laboratory Co., Ltd.) 0.030 mol Comparative Example 12

In COMPARATIVE EXAMPLE 12, a proton conductor and an evaluation pellet were prepared, and the proton conductivity was evaluated in the same manner as in EXAMPLE 1 except for the following item (1).

(1) The starting materials for the proton conductor were changed to the following materials.

Ba(NO$_3$)$_2$ (manufactured by KANTO CHEMICAL CO., INC.) 0.100 mol

ZrO(NO$_3$)$_2$·2H$_2$O (manufactured by KANTO CHEMICAL CO., INC.) 0.090 mol

Yb(NO$_3$)$_3$·xH$_2$O (2<x<6, manufactured by Kojundo Chemical Laboratory Co., Ltd.) 0.010 mol Comparative Example 13

In COMPARATIVE EXAMPLE 13, a proton conductor and an evaluation pellet were prepared, and the proton conductivity was evaluated in the same manner as in EXAMPLE 1 except for the following item (1).

(1) The starting materials for the proton conductor were changed to the following materials.

Ba(NO$_3$)$_2$ (manufactured by KANTO CHEMICAL CO., INC.) 0.100 mol

ZrO(NO$_3$)$_2$·2H$_2$O (manufactured by KANTO CHEMICAL CO., INC.) 0.080 mol

Yb(NO$_3$)$_3$·xH$_2$O (2<x<6, manufactured by Kojundo Chemical Laboratory Co., Ltd.) 0.020 mol (Evaluation Results of Proton Conductivity)

The results of the proton conductivity of the proton conductors prepared will be discussed based on Table 1.

First, EXAMPLE 8 in which x=0.20 and y=0.10 will be compared with COMPARATIVE EXAMPLES 2, 3, 4, 6 and 8 having the same dopant compositional ratio. BaZr$_{0.70}$Yb$_{0.20}$Sc$_{0.10}$O$_{3-\delta}$ of EXAMPLE 8 exhibited the highest proton conductivity. From the comparison of EXAMPLE 9 in which x=0.20 and y=0.20 with COMPARATIVE EXAMPLES 5 and 7, BaZr$_{0.60}$Yb$_{0.20}$Sc$_{0.20}$O$_{3-\delta}$ of EXAMPLE 9 exhibited the highest proton conductivity.

From the above results, it was expected that Yb and Sc would be the best dopant combination in any compositional ratio.

Next, differences will be described that are brought about by variations in the compositional ratio of BaZr$_{1-x-y}$Yb$_x$Sc$_y$O$_{3-\delta}$ based on EXAMPLES 1 to 10 and COMPARATIVE EXAMPLE 1.

Among these examples, only COMPARATIVE EXAMPLE 1 in which the composition was represented by BaZr$_{0.50}$Yb$_{0.30}$Sc$_{0.20}$O$_{3-\delta}$ resulted in cracking during the heat treatment in the process of evaluation pellet preparation. When Yb and Sc dopants represent a high proportion, an increased amount of H$_2$O is dissolved into the material to give rise to expansion of the crystal lattices. A dense pellet will be incapable of withstanding this expansion and the pellet will crack.

That is, increasing the proportion of the dopants leads to the occurrence of expansion of the crystal lattices. Thus, it is expected that cracks will occur similarly when (x+y)≤0.5. In contrast, cracking did not occur in the pellets of the proton conductors of EXAMPLES 1 to 10 in which (x+y)<0.5.

In EXAMPLE 9, COMPARATIVE EXAMPLE 5 and COMPARATIVE EXAMPLE 7 in which (x+y)≤0.4, the pellets cracked after the evaluation. On the other hand, the pellets of EXAMPLES 1 to 8 and EXAMPLE 10 in which (x+y)<0.4 did not crack even after the evaluation, and thus probably experienced limited expansion stemming from hydration.

Next, comparison will be made between EXAMPLES 1 and 2 in which (x+y)=0.15, between EXAMPLES 4, 6 and 7 in which (x+y)=0.25, and between EXAMPLES 5 and 8 in which (x+y)=0.30.

In all cases, the proton conductivities at 400° C. and 600° C. were higher when x y. Specifically, the proton conductivity was higher when the doping amount of Yb was larger than the doping amount of Sc.

EXAMPLES 6 to 10 in which x≥0.15 resulted in higher proton conductivity than EXAMPLES 1 to 5 in which x<0.15.

The highest proton conductivity was exhibited in EXAMPLE 8 in which x=0.2 and y=0.1.

The proton conductor of COMPARATIVE EXAMPLE 10 that was doped with Sc alone and was free from Yb doping had lower proton conductivities at 400° C. and 600° C. than the proton conductor of EXAMPLE 3 having the same dopant proportion (namely, the value of (x+y)). Similarly, the proton conductor of COMPARATIVE EXAMPLE 11 that was doped with Sc alone and was free from Yb doping had lower proton conductivities at 400° C. and 600° C. than the proton conductors of EXAMPLES 5 and 8 having the same dopant proportion (namely, the value of (x+y)).

The proton conductor of COMPARATIVE EXAMPLE 13 that was doped with Yb alone and was free from Sc doping had lower proton conductivity at the lower temperature of 400° C. than the proton conductor of EXAMPLE 3 having the same dopant proportion (namely, the value of (x+y)).

TABLE 1

| | Synthesized compound | | | | Element with larger value | Proton conductivity [10$^{-2}$ S·cm$^{-1}$] | | Cracks | |
|---|---|---|---|---|---|---|---|---|---|
| | Composition | Value of x | Value of y | Value of (x + y) | | 400° C. | 600° C. | During preparation | After evaluation |
| EX. 1 | BaZr$_{(1-x-y)}$Yb$_x$Sc$_y$O$_{3-\delta}$ | 0.05 | 0.10 | 0.15 | Sc | 0.08 | 0.32 | Absent | Absent |
| EX. 2 | BaZr$_{(1-x-y)}$Yb$_x$Sc$_y$O$_{3-\delta}$ | 0.10 | 0.05 | 0.15 | Yb | 0.13 | 0.47 | Absent | Absent |
| EX. 3 | BaZr$_{(1-x-y)}$Yb$_x$Sc$_y$O$_{3-\delta}$ | 0.10 | 0.10 | 0.20 | — | 0.35 | 0.53 | Absent | Absent |
| EX. 4 | BaZr$_{(1-x-y)}$Yb$_x$Sc$_y$O$_{3-\delta}$ | 0.10 | 0.15 | 0.25 | Sc | 0.35 | 0.53 | Absent | Absent |
| EX. 5 | BaZr$_{(1-x-y)}$Yb$_x$Sc$_y$O$_{3-\delta}$ | 0.10 | 0.20 | 0.30 | Sc | 0.48 | 0.73 | Absent | Absent |
| EX. 6 | BaZr$_{(1-x-y)}$Yb$_x$Sc$_y$O$_{3-\delta}$ | 0.15 | 0.10 | 0.25 | Yb | 0.66 | 0.82 | Absent | Absent |
| EX. 7 | BaZr$_{(1-x-y)}$Yb$_x$Sc$_y$O$_{3-\delta}$ | 0.20 | 0.05 | 0.25 | Yb | 0.62 | 0.84 | Absent | Absent |

TABLE 1-continued

| | Composition | Value of x | Value of y | Value of (x + y) | Element with larger value | Proton conductivity [$10^{-2}$ S·cm$^{-1}$] 400° C. | 600° C. | Cracks During preparation | After evaluation |
|---|---|---|---|---|---|---|---|---|---|
| EX. 8 | $BaZr_{(1-x-y)}Yb_xSc_yO_{3-\delta}$ | 0.20 | 0.10 | 0.30 | Yb | 1.32 | 1.48 | Absent | Absent |
| EX. 9 | $BaZr_{(1-x-y)}Yb_xSc_yO_{3-\delta}$ | 0.20 | 0.20 | 0.40 | — | 0.64 | 0.75 | Absent | Present |
| EX. 10 | $BaZr_{(1-x-y)}Yb_xSc_yO_{3-\delta}$ | 0.25 | 0.10 | 0.35 | Yb | 0.54 | 0.51 | Absent | Absent |
| COMP. EX. 1 | $BaZr_{(1-x-y)}Yb_xSc_yO_{3-\delta}$ | 0.30 | 0.20 | 0.50 | Yb | — | — | Present | — |
| COMP. EX. 2 | $BaZr_{(1-x-y)}Yb_xSc_yO_{3-\delta}$ | 0.20 | 0.10 | 0.30 | Y | 0.68 | 1.02 | Absent | Absent |
| COMP. EX. 3 | $BaZr_{(1-x-y)}Lu_xSc_yO_{3-\delta}$ | 0.20 | 0.10 | 0.30 | Lu | 0.54 | 0.93 | Absent | Absent |
| COMP. EX. 4 | $BaZr_{(1-x-y)}Yb_xIn_yO_{3-\delta}$ | 0.20 | 0.10 | 0.30 | Yb | 0.70 | 0.87 | Absent | Absent |
| COMP. EX. 5 | $BaZr_{(1-x-y)}Yb_xIn_yO_{3-\delta}$ | 0.20 | 0.20 | 0.40 | — | 0.41 | 0.51 | Absent | Present |
| COMP. EX. 6 | $BaZr_{(1-x-y)}Yb_xLu_yO_{3-\delta}$ | 0.20 | 0.10 | 0.30 | Yb | 0.15 | 0.11 | Absent | Absent |
| COMP. EX. 7 | $BaZr_{(1-x-y)}Yb_xLu_yO_{3-\delta}$ | 0.20 | 0.20 | 0.40 | — | 0.27 | 0.37 | Absent | Present |
| COMP. EX. 8 | $BaZr_{(1-x-y)}Yb_xAl_yO_{3-\delta}$ | 0.20 | 0.10 | 0.30 | Yb | 0.01 | 0.11 | Absent | Absent |
| COMP. EX. 9 | $BaZr_{(1-x-y)}Yb_xSc_yO_{3-\delta}$ | 0 | 0.10 | 0.10 | — | 0.07 | 0.21 | Absent | Absent |
| COMP. EX. 10 | $BaZr_{(1-x-y)}Yb_xSc_yO_{3-\delta}$ | 0 | 0.20 | 0.20 | — | 0.08 | 0.42 | Absent | Absent |
| COMP. EX. 11 | $BaZr_{(1-x-y)}Yb_xSc_yO_{3-\delta}$ | 0 | 0.30 | 0.30 | — | 0.40 | 0.66 | Absent | Absent |
| COMP. EX. 12 | $BaZr_{(1-x-y)}Yb_xSc_yO_{3-\delta}$ | 0.10 | 0 | 0.10 | — | 0.07 | 0.43 | Absent | Absent |
| COMP. EX. 13 | $BaZr_{(1-x-y)}Yb_xSc_yO_{3-\delta}$ | 0.20 | 0 | 0.20 | — | 0.33 | 1.10 | Absent | Absent |

<Electrochemical Cell>

(Fabrication of Electrochemical Cell)

Figure 5:
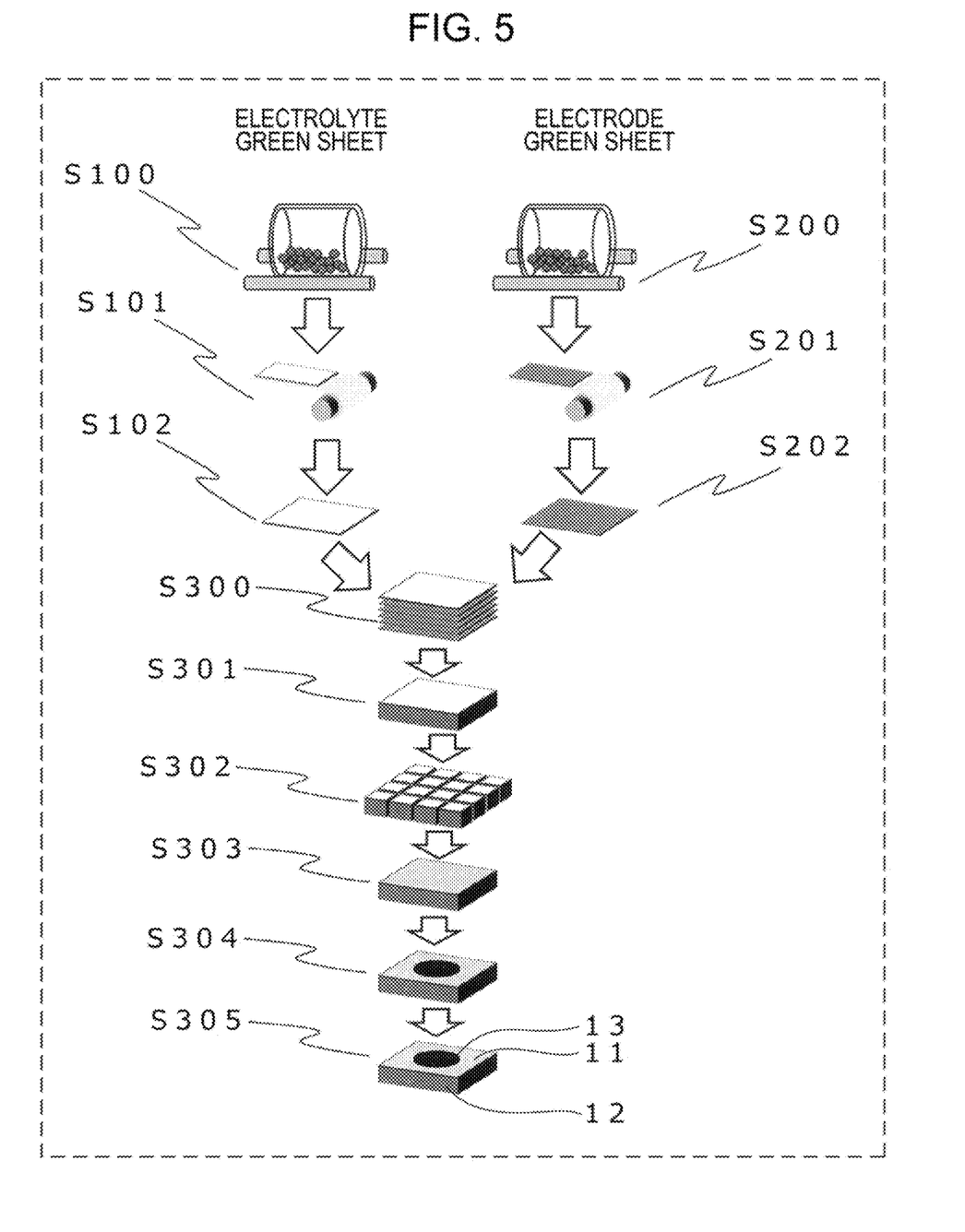
FIG. 5 illustrates a procedure for fabricating an electrochemical cell using a proton conductor of EXAMPLE 13.

The fabrication of an electrolyte membrane and an electrochemical cell using the electrolyte membrane will be described with reference to FIG. 5.

(1) Preparation of Electrolyte Green Sheet (See S100 to S102)

First, an electrolyte ceramic slurry was prepared. The following materials including the proton conductor prepared in EXAMPLE 8 (namely, $BaZr_{0.70}Yb_{0.20}Sc_{0.10}O_{3-\delta}$) were mixed with one another.

Proton conductor of EXAMPLE 8 ($BaZr_{0.70}Yb_{0.20}Sc_{0.10}O_{3-\delta}$) 50 g Polyvinyl butyral (manufactured by SEKISUI CHEMICAL CO., LTD.) 5 g Butylbenzyl phthalate (manufactured by KANTO CHEMICAL CO., INC.) 1.25 g Mixed solvent 40 g The mixed solvent was composed of butyl acetate (20 g, manufactured by KANTO CHEMICAL CO., INC.) and 1-butanol (20 g, manufactured by KANTO CHEMICAL CO., INC.). An electrolyte ceramic slurry was thus prepared.

Next, a membrane of the electrolyte ceramic slurry was formed by a doctor blade method on a support sheet made of a polyethylene terephthalate film having a thickness of about 50 μm. The resultant membrane of the slurry was heated at a temperature of 80° C. to evaporate the solvent. An electrolyte green sheet was thus prepared. The electrolyte green sheet had a thickness of about 21 μm.

(2) Preparation of Electrode Green Sheet (See S200 to S202)

An electrode ceramic slurry was prepared by mixing the following materials.

Proton conductor of EXAMPLE 8 ($BaZr_{0.70}Yb_{0.20}Sc_{0.10}O_{3-\delta}$) 10 g Polyvinyl butyral (manufactured by SEKISUI CHEMICAL CO., LTD.) 5 g Butylbenzyl phthalate (manufactured by KANTO CHEMICAL CO., INC.) 1.25 g NiO (manufactured by Sumitomo Metal Mining Co., Ltd.) 40 g Mixed solvent 40 g The mixed solvent was composed of butyl acetate (20 g, manufactured by KANTO CHEMICAL CO., INC.) and 1-butanol (20 g, manufactured by KANTO CHEMICAL CO., INC.).

Next, a membrane of the electrode ceramic slurry was formed by a doctor blade method on a support sheet made of a polyethylene terephthalate film having a thickness of about 50 μm. The membrane of the slurry had a thickness of about 30 μm. The membrane of the slurry thus obtained was heated at a temperature of 80° C. An electrode green sheet was thus prepared.

(3) Staking of Sheets (See S300 to S303)

The electrolyte green sheet was cut to give a cutout of the electrolyte green sheet. Next, the polyethylene terephthalate film was removed from the electrolyte green sheet. The cutout of the electrolyte green sheet had a size of 140 mm×140 mm. The electrode green sheet was cut to give a cutout of the electrode green sheet. The cutout of the electrode green sheet had a size of 140 mm×140 mm.

A plurality of cutouts of the electrode green sheet were stacked together to give a stack. The stack was then hot pressed. The hot pressing was performed under conditions of 85° C. and 13 MPa. A first electrode was thus prepared.

Further, the cutout of the electrolyte green sheet was laminated onto one main surface of the first electrode to form a stack. The stack thus obtained was then hot pressed. The hot pressing was performed under conditions of 80° C. and 13 MPa. A unit was thus obtained.

The unit obtained was further pressed with a press (manufactured by Sansho Industry Co., Ltd.) at a pressure of 50 MPa to give a stack. The thickness remained almost unchanged and was about 700 µm.

The stack was cut into a size of 20 mm×20 mm.

Lastly, the stack that had been cut was heat-treated in an air atmosphere at 1400° C. for 2 hours. A membrane electrode assembly was thus fabricated. The membrane electrode assembly was an assembly of the electrolyte membrane and the first electrode.

(4) Formation of Second Electrode (See S304 and S305)

Further, a second electrode was formed on the membrane electrode assembly obtained.

An LSC paste (manufactured by NORITAKE CO., LIMITED, composition: $La_{0.6}Sr_{0.4}CoO_{3-\delta}$) was applied by a screen printing method onto the main surface of the membrane electrode assembly on which the electrolyte membrane was exposed. The LSC paste applied had a diameter of 10 mm. A cell precursor was thus obtained.

Subsequently, the cell precursor was heat-treated in an air atmosphere at 950° C. for 2 hours. An electrochemical cell was thus fabricated that included the first electrode, the electrolyte membrane and a second electrode. The first electrode functions as a fuel electrode. The second electrode functions as an air electrode.

(Evaluation of Electrochemical Cell)

Hydrogen and air were supplied to the electrochemical cell obtained by the above method to perform a fuel cell power generation test.

The electrochemical cell that had been fabricated was set in a fuel cell holder (manufactured by CHINO CORPORATION) and was installed into an electric furnace. The temperature was increased until the temperature of the fuel cell holder reached 700° C. At 700° C., hydrogen gas that had been humidified at 20° C. was supplied to the fuel electrode (NiO—$BaZr_{0.70}Yb_{0.20}Sc_{0.10}O_{3-\delta}$), and air gas that had been humidified at 20° C. was supplied to the air electrode, each at 100 cc/min. The fuel electrode was reduced for 12 hours. Next, the temperature of the fuel cell holder was lowered to 600° C. and was maintained at 600° C. for 1 hour. An electrochemical evaluation was carried out using a potentiogalvanostat (MODULAB XM ECS, manufactured by AMETEK. Inc.).

In the electrochemical evaluation, the potential between the fuel electrode and the air electrode was swept from the open circuit voltage to 0.4 V at 4 mV/sec, and a current-voltage curve and a current-output curve were obtained. The maximum output that was obtained was 0.23 W/cm², and it was confirmed that the electrochemical cell could produce a current.

The proton conductor according to the present disclosure may be suitably used for an electrochemical cell and a fuel cell.

What is claimed is:

1. A proton conductor comprising:
   a compound represented by chemical formula $BaZr_{(1-x-y)}Yb_xSc_yO_{3-\delta}$, wherein the chemical formula satisfies $0 < x < 0.5$, $0 < y < 0.5$, $0.15 < (x+y) < 0.5$, and $0 < \delta < 0.5$.

2. The proton conductor according to claim 1, wherein the chemical formula satisfies mathematical formula: $y \leq x$.

3. The proton conductor according to claim 1, wherein the chemical formula satisfies mathematical formula: $0.25 \leq (x+y) < 0.5$.

4. The proton conductor according to claim 1, wherein the chemical formula satisfies mathematical formula: $(x+y) \leq 0.35$.

5. The proton conductor according to claim 1, wherein the chemical formula satisfies mathematical formula: $0.15 \leq x < 0.5$.

6. The proton conductor according to claim 1, wherein the chemical formula satisfies mathematical formulas: $x=0.2$ and $y=0.1$.

7. An electrolyte membrane comprising:
   the proton conductor according to claim 1.

8. A membrane electrode assembly comprising:
   the electrolyte membrane according to claim 7; and
   a first electrode provided on a first main surface of the electrolyte membrane.

9. An electrochemical cell comprising:
   the membrane electrode assembly according to claim 8; and
   a second electrode,
   the first electrode, the electrolyte membrane and the second electrode being arranged in the order.

10. A fuel cell stack comprising:
    a plurality of the electrochemical cells according to claim 9.

11. The proton conductor according to claim 1, wherein the chemical formula satisfies mathematical formula: $0.20 \leq (x+y) < 0.5$.

* * * * *